United States Patent
Lin et al.

(10) Patent No.: US 8,678,296 B2
(45) Date of Patent: Mar. 25, 2014

(54) TWO-DIMENSIONAL OPTICAL IDENTIFICATION DEVICE WITH SAME GRAY LEVEL

(75) Inventors: Shih-Chien Lin, Miaoli (TW); Yu-Hsun Wang, Kaohsiung (TW)

(73) Assignee: Generalplus Technology Inc., Hsinchu (TW)

( * ) Notice: Subject to any disclaimer, the term of this patent is extended or adjusted under 35 U.S.C. 154(b) by 30 days.

(21) Appl. No.: 13/290,252

(22) Filed: Nov. 7, 2011

(65) Prior Publication Data

US 2012/0298761 A1    Nov. 29, 2012

(30) Foreign Application Priority Data

May 25, 2011   (TW) .............................. 100118252 A

(51) Int. Cl.
- *G06K 19/06* (2006.01)
- *G06K 19/00* (2006.01)
- *G06K 7/10* (2006.01)

(52) U.S. Cl.
USPC ........................... 235/494; 235/454; 235/487

(58) Field of Classification Search
USPC .......................................... 235/454, 487, 494
See application file for complete search history.

(56) References Cited

U.S. PATENT DOCUMENTS

| | | | | |
|---|---|---|---|---|
| 5,984,189 | A  * | 11/1999 | Tomioka | 235/487 |
| 2002/0030104 | A1 * | 3/2002 | Matsui et al. | 235/454 |
| 2003/0112471 | A1 * | 6/2003 | Damera-Venkata et al. | 358/3.28 |
| 2005/0109852 | A1 * | 5/2005 | Walmsley et al. | 235/494 |
| 2005/0173533 | A1 * | 8/2005 | Pettersson | 235/454 |
| 2005/0173544 | A1 * | 8/2005 | Yoshida | 235/494 |
| 2006/0151621 | A1 * | 7/2006 | Ladas et al. | 235/494 |
| 2007/0075151 | A1 * | 4/2007 | Ericson | 235/494 |
| 2007/0152060 | A1 * | 7/2007 | Kiliccote | 235/462.09 |
| 2007/0164110 | A1 * | 7/2007 | Yoshida | 235/454 |
| 2007/0199990 | A1 * | 8/2007 | Sonoda | 235/454 |
| 2007/0246547 | A1 * | 10/2007 | Tsai et al. | 235/494 |
| 2008/0185437 | A1 * | 8/2008 | Chen | 235/454 |
| 2009/0032596 | A1 * | 2/2009 | Pfestorf | 235/454 |
| 2009/0108081 | A1 * | 4/2009 | Zwirner et al. | 235/494 |
| 2009/0302114 | A1 * | 12/2009 | Ao et al. | 235/454 |
| 2010/0006657 | A1 * | 1/2010 | Liao et al. | 235/494 |
| 2010/0327066 | A1 * | 12/2010 | Khan | 235/462.01 |
| 2013/0168451 | A1 * | 7/2013 | Decoux et al. | 235/454 |

* cited by examiner

*Primary Examiner* — Christle Marshall
*Assistant Examiner* — Claude J Brown
(74) *Attorney, Agent, or Firm* — Bacon & Thomas, PLLC

(57) ABSTRACT

On a two-dimensional optical identification device with same gray level, a plurality of two-dimensional optical identification codes are arranged, each having a plurality of data blocks and an outer positioning block. Each data block has a plurality of defined patterns, and each defined pattern is located in one of virtual areas produced by equally dividing the data block. The outer positioning block has a plurality of first positioning points and a first direction identification point, and is placed at two adjacent boundaries of the plurality of data blocks for defining the positions of the plurality of data blocks. A fixed position data block is selected as a data block coding indication block for indicating the coding of the other data blocks.

13 Claims, 18 Drawing Sheets

910  520  11

10

01  00

910  520  10

01

00  11

TWO-DIMENSIONAL OPTICAL IDENTIFICATION DEVICE WITH SAME GRAY LEVEL

CROSS REFERENCE TO RELATED APPLICATION

This application claims the benefits of the Taiwan Patent Application Serial Number 100118252, filed on May 25, 2011, the subject matter of which is incorporated herein by reference.

BACKGROUND OF THE INVENTION

1. Field of the Invention

The present invention relates to the technical field of two-dimensional optical identification and, more particularly, to a two-dimensional optical identification device with same gray level.

2. Description of Related Art

For increasing the convenience, fun, and efficiency of reading a document, a typical way embeds optical identification codes into pictures in which the optical identification codes are printed on the document. An external reader can thus read the optical identification code corresponding to a part of pictures, and activate an output device to, for example, play a voice based on the read optical identification code. Thus, the played voice can effectively help the reading. However, such a technique has to embed the optical identification code into the pictures of the document, which certainly causes the complexity of making a document and affects the picture display. Therefore, it is desired to accurately read the optical identification code without being affected by the pictures.

In the known patents, U.S. Pat. No. 7,530,496 granted to Chen for a "Surface sensitive input device with indexes and computer system using the input device" discloses a layer of points corresponding to an optical identification code added onto a raw image, as show in FIG. 1. The optical identification code 100 of FIG. 1 has a plurality of indexing points in an isotropic arrangement. The indexing points are tiny and thus invisible to human eyes. As shown in FIG. 1, such indexing points are arranged in an isotropic manner, each indexing point having a radius of about 100 μm. The indexing points include a center point 110, a plurality of direction points 121 and 122, a plurality of first data points 131-136, and a plurality of second data points 1401-1412. The direction point 122 is provided as a direction recognition point in blank or hollow, in which the hollow direction point 122 is used to represent no point printed.

Such an optical identification code 100 can present a different picture object capable of being read by an optical reader for further processing. For example, different optical identification codes representing different picture objects correspond to different voices, respectively, and accordingly a corresponding voice can be played when the optical reader reads a picture object.

However, as shown in the optical identification code 100 of FIG. 1, the locations of the first data points 131-136 and the second data points 1401-1412 at the outer circle are determined by using the center point 110, a direction point 121 and five direction points 122. Since there is no auxiliary positioning point on the outer circle, it is possible to have a deformed picture taken by a slant lens, which further increases the difficulty of locating the data points. Also, since a blank indicates no printed point, it is likely to have an effect of non-uniform gray level when multiple optical identification codes 100 are printed in a picture object. Further, when the same information is carried, the patterns of the optical identification codes 100 are the same, resulting in the generation of texture feeling on vision.

FIG. 2 schematically illustrates another optical identification code 200. The optical identification code 200 is comprised of one positioning block 201 and eight coded data blocks 202-209 arranged in a nine-square grid. Each center of the coded data blocks 202-209 is filled up and used as an auxiliary positioning point to thereby avoid the difficulty on locating the data points due to lack of auxiliary positioning point on the outer. The positioning block 201 has five points filled up and used as major positioning points to reduce the difficulty of locating the data points. However, the major positioning points of the block 201 are obvious to see, in which users can easily sense a texture when the optical identification codes 200 repeatedly present on the surface of a picture. In addition, the auxiliary positioning points and data points contained in the coded data blocks 202-209 can cause a non-uniform distribution of the data points, resulting in producing the effect of non-uniform gray level.

FIG. 3 schematically illustrates a further optical identification code 300. The optical identification code 300 is comprised of a content part 310 and a position part 320. The content part 310 has nine coded data blocks, and the position part 320 has seven positioning blocks. The position part 320 is arranged at two adjacent sides of the content part 310. In this case, in order to improve the equality effect of gray level, all positioning points are arranged at the outer with a shifted point 321 to indicate the direction information. However, for the same gray level, all data points 311 are placed in proximity to an intersection of virtual lines 313 and 315, with a small offset. In addition, since all positioning points arranged at the outer part are obvious, it is likely to produce a texture feeling on vision when the optical identification code 300 is repeatedly present.

Therefore, it is desirable to provide an improved optical identification device to mitigate and/or obviate the aforementioned problems.

SUMMARY OF THE INVENTION

The object of the present invention is to provide a two-dimensional optical identification device with same gray level, which can improve the equality effect of gray level and dynamically present a pattern between adjacent data blocks of the two-dimensional optical identification code so as to avoid the generation of texture feeling.

To achieve the object, there is provided a two-dimensional optical identification device with same gray level, on which a plurality of two-dimensional optical identification codes are arranged. Each two-dimensional optical identification code comprises: a plurality of data blocks, each data block having a plurality of defined patterns, each defined pattern being located in selected one of a plurality of virtual areas produced by equally dividing the data block; and an outer positioning block having a plurality of first positioning points and a first direction identification point and placed at two adjacent boundaries of the data blocks for defining positions of the data blocks; wherein at least one fixed position data block is selected as a data block coding indication block from the data blocks for indicating coding of the other data blocks.

Other objects, advantages, and novel features of the invention will become more apparent from the following detailed description when taken in conjunction with the accompanying drawings.

DETAILED DESCRIPTION OF THE PREFERRED EMBODIMENT

Figure 4:
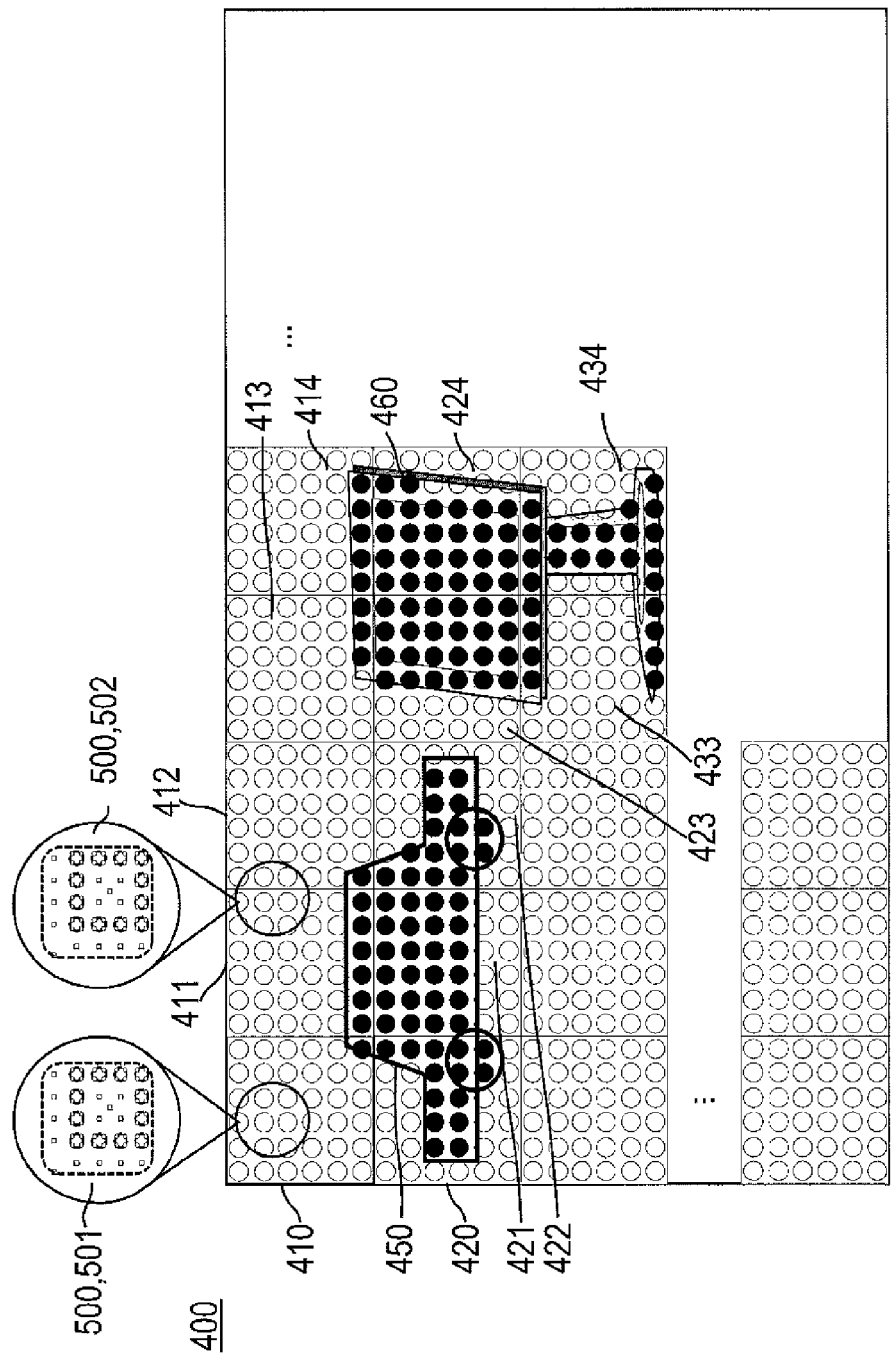
FIG. 4 schematically illustrates a two-dimensional optical identification device with same gray level according to an embodiment of the invention.

FIG. 4 schematically illustrates a two-dimensional optical identification device with same gray level for quick decoding in accordance with an embodiment of the invention. As shown in FIG. 4, the device 400 is partitioned into a plurality of areas, such as 410, 411, 434, and the like, each having the same size and having a plurality of two-dimensional optical identification codes 500 with same gray level to represent a corresponding value. For example, the optical identifications 501 and 502 represent values of areas 410 and 411 respectively. The device 400 includes two picture objects 450 and 460, where the object 450 covers areas 410, 411, 412, 420, 421, 422, and the object 460 covers areas 413, 414, 423, 424, 433, 434.

Figure 5:
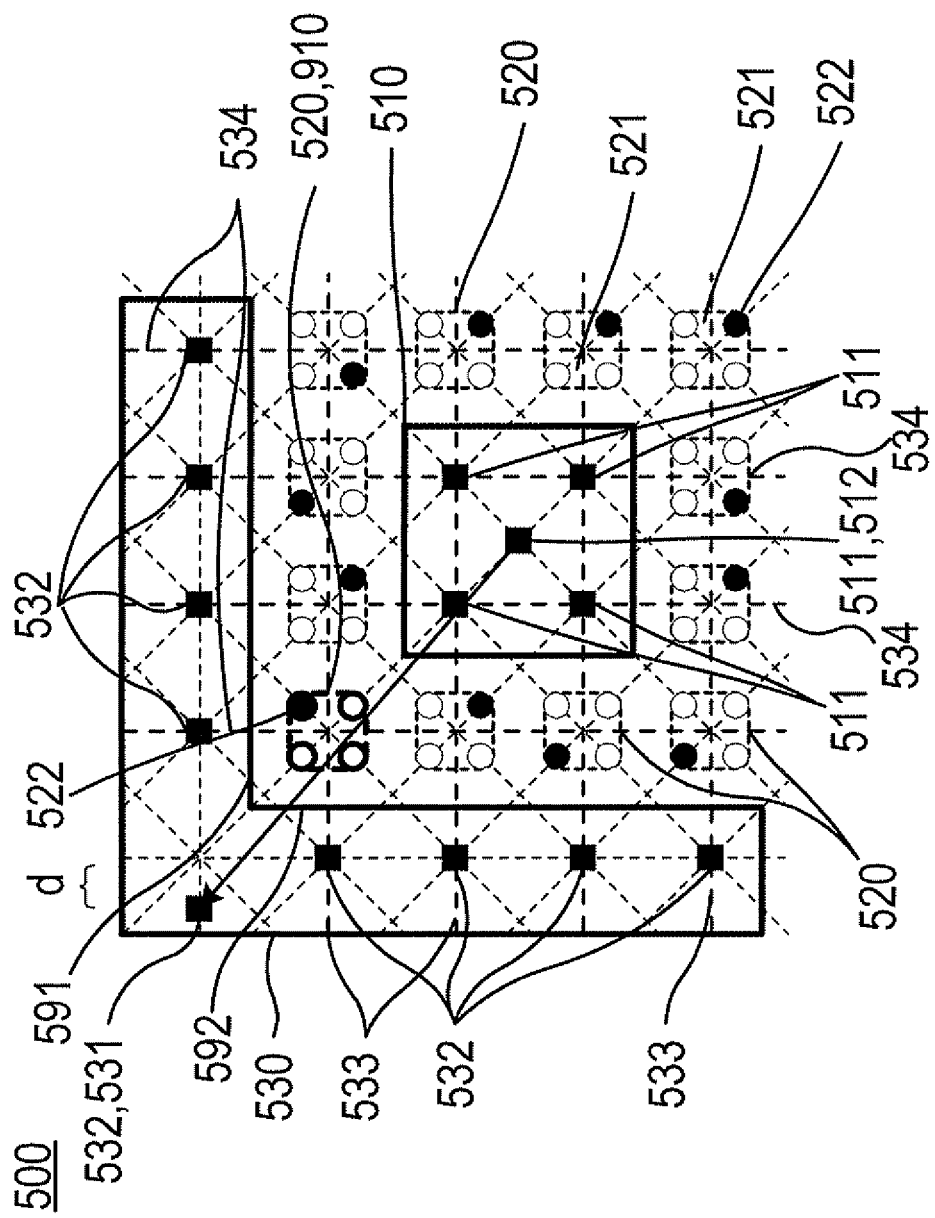
FIG. 5 schematically illustrates a two-dimensional optical identification code with same gray level according to an embodiment of the invention.

FIG. 5 schematically shows a two-dimensional optical identification code 500 with same gray level according to an embodiment of the invention. The two-dimensional optical identification code 500 includes an inner positioning block 510, a plurality of data blocks 520, and an outer positioning block 530.

The data blocks 520 are placed around the first positioning block 510. Each of the data blocks 520 has a plurality of defined patterns, each being located in selected one of virtual areas produced by equally dividing the data block 520. One or more fixed position data blocks is selected as a data block encoding indication block 910 for indicating the coding of the other data blocks. In this embodiment, one fixed position data block 520 is used as a data block encoding indication block 910 for indicating the coding of the other data blocks.

The outer positioning block 530 has a plurality of first positioning points 531, 532 placed at two adjacent boundaries 591, 592 of the data blocks 520 for defining the positions of the data blocks.

The inner positioning block 510 has a plurality of second positioning points 511 for quickly detecting the pattern of the two-dimensional optical identification code 500 with same gray level.

One of the plurality of first positioning points 532 is defined as a first direction identification point 531 to indicate the identification direction of the two-dimensional optical identification code 500.

As shown in FIG. 5, the plurality of second positioning points 511 include five second positioning points 511, 512 in which four second positioning points 511 are distributed on four corners of a virtual square (formed with the four first positioning points 511) while one second positioning point 512 is located at the center of the virtual square.

The outer positioning block 530 includes N first positioning points 532 and the first direction identification point 531. The N first positioning points 532 form an L shape, and the first direction identification point 531 is located on a position with a first offset d from the intersection of two lines of the L shape, where N is a positive integer and, in this embodiment, N=8.

In the N first positioning points 532, I first positioning points 532 are used to define I first-direction virtual lines 533, and J first positioning points 532 are used to define J second-direction virtual lines 534. The I first-direction virtual lines 533 are vertical to the J second-direction virtual lines 534. The center of each data block 520 is located at the intersection of a first-direction virtual line 533 and a second-direction virtual line 534, where I, J are positive integers, and I+J=N. In this embodiment, when N=8, I=4 and J=4. In other embodiments, N may be 9, so as to have I=5 and J=4, and so on, which can be easily achieved by those skilled in the art, and thus a detailed description is deemed unnecessary.

Figure 6:
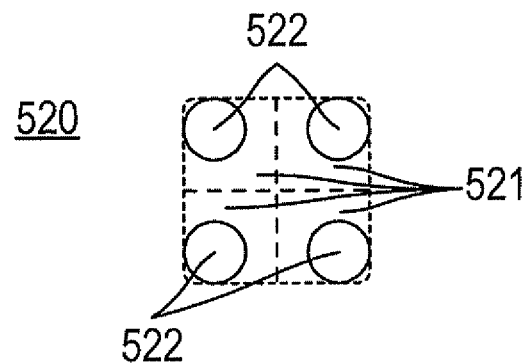
FIG. 6 schematically illustrates an enlarged data block according to an embodiment of the invention.

As shown in FIG. 5, each data block 520 is partitioned into a plurality of virtual areas 521 by a first-direction virtual line 533 and a second-direction virtual line 534. FIG. 6 schematically illustrates an enlarged data block 520 according to an embodiment of the invention. In this embodiment, the number of virtual areas 521 is four.

Each data block 520 has four defined patterns 522 respectively located in the four virtual areas 521. In each data block 520, only one of the four defined patterns 522 is filled up to thereby indicate a two-bit binary code including 00, 01, 10, and 11. The defined pattern can be a circle or a square.

Figure 7:
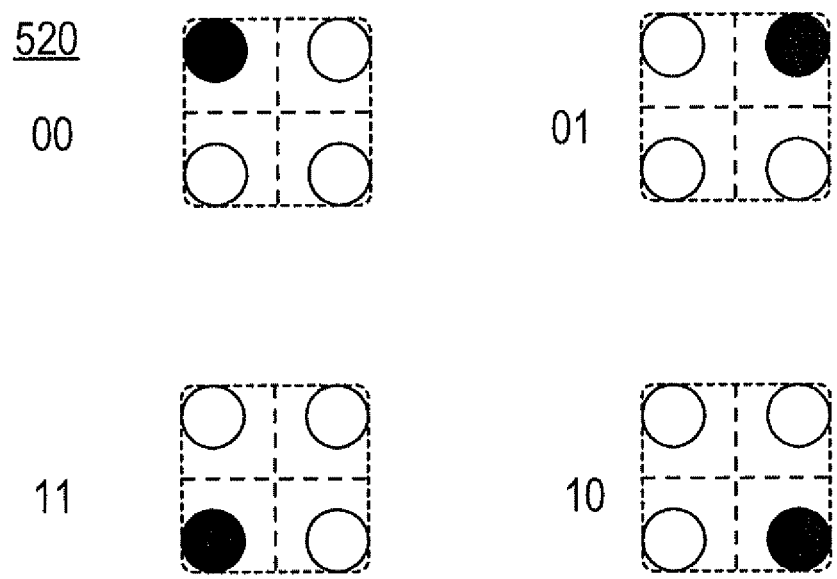
FIG. 7 schematically illustrates the coded data blocks according to an embodiment of the invention.

By selectively locating the defined patterns 522 in one of the virtual areas 521 produced by equally dividing a data block of the data blocks 520, each two-dimensional optical identification code 500 records plural two-bit information. FIG. 7 schematically illustrates coded data blocks according to an embodiment of the invention. When the defined pattern 522 of the virtual area 521 on the upper left corner of a data block 520 is filled up, it indicates a two-bit binary code of 00. When the defined pattern 522 of the virtual area 521 on the upper right corner of a data block 520 is filled up, it indicates a two-bit binary code of 01. When the defined pattern 522 of the virtual area 521 on the lower right corner of a data block 520 is filled up, it indicates a two-bit binary code of 10. When the defined pattern 522 of the virtual area 521 on the lower left corner of a data block 520 is filled up, it indicates a two-bit binary code of 11.

The data block coding indication block 910 of fixed position is used to indicate the coding of the other data blocks 520.

Figure 8A:
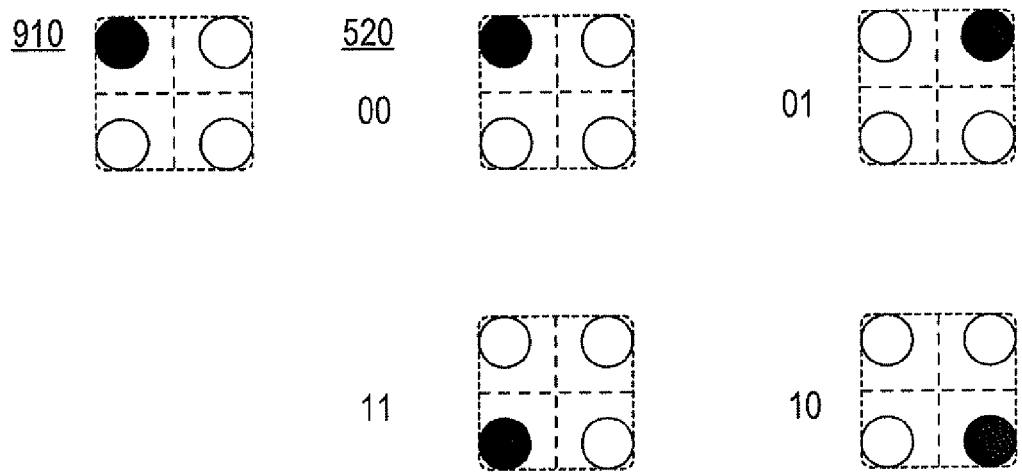
FIGS. 8A-8D schematically illustrate the data block coding indication blocks and corresponding coded data according to an embodiment of the invention.

FIGS. 8A-8D schematically illustrate the data block coding indication block 910 and corresponding coded data according to an embodiment of the invention. The data block coding indication block 910 is used to indicate the coding of the other data blocks 520. As shown in FIG. 8A, when the defined pattern 522 of the virtual area on the upper left corner of the data block coding indication block 910 is filled up, the defined patterns 522 of the virtual areas 521 on the upper left corner, on the upper right corner, on the lower right corner, and on the lower left corner are filled up to respectively indicate a two-bit binary code of 00, 01, 10, and 11 for the data blocks 520.

Figure 8B:
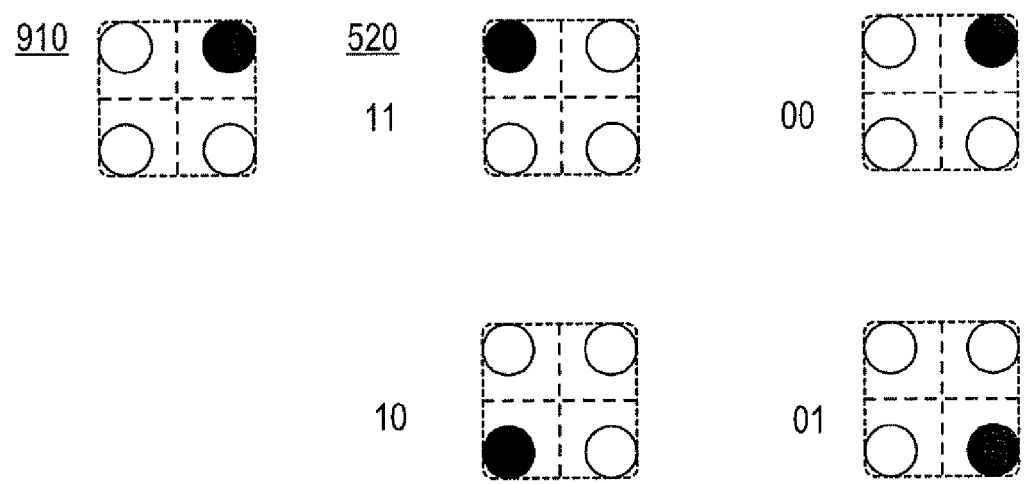

As show in FIG. 8B, when the defined pattern 522 of the virtual area of the data block coding indication block 910 on the upper right corner is filled up, the defined patterns 522 of the virtual areas 521 on the upper left corner, on the upper right corner, on the lower right corner, and on the lower left corner are filled up to respectively indicate a two-bit binary code of 11, 00, 01, and 10 for the data blocks 520.

Figure 8C:
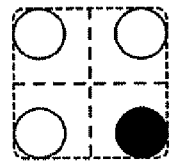
Figure 8C:
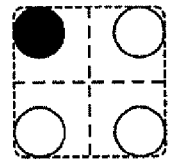
Figure 8C:
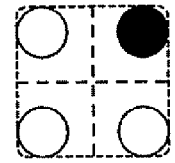
Figure 8C:
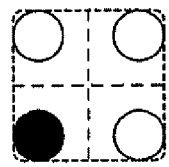
Figure 8C:
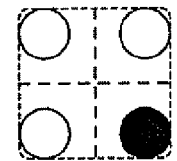

As show in FIG. 8C, when the defined pattern 522 of the virtual area of the data block coding indication block 910 on the lower right corner is filled up, the defined patterns 522 of the virtual areas 521 on the upper left corner, on the upper right corner, on the lower right corner, and on the lower left corner are filled up to respectively indicate a two-bit binary code of 10, 11, 00, and 01 for the data blocks 520.

Figure 8D:
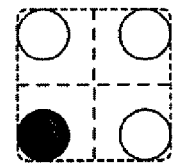
Figure 8D:
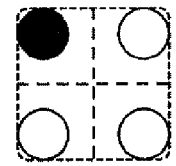
Figure 8D:
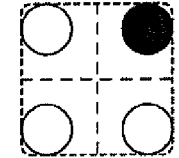
Figure 8D:
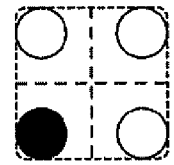
Figure 8D:
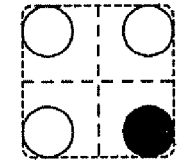

As show in FIG. 8D, when the defined pattern 522 of the virtual area of the data block coding indication block 910 on the lower right corner is filled up, the defined patterns 522 of the virtual areas 521 on the upper left corner, on the upper right corner, on the lower right corner, and on the lower left corner are filled up to respectively indicate a two-bit binary code of 01, 10, 11, and 00 for the data blocks 520.

FIGS. 9A-9D schematically illustrate the data block coding indication block and corresponding coded data according to another embodiment of the invention. The data block coding indication block 910 is used to indicate the coding of the other data blocks 520.

In FIGS. 9A-9D, the coding of each data block 520 is performed with the data block coding indication block 910 as shown in FIG. 8A. Namely, the two-bit binary code of 00 is indicated by filling up the defined pattern 522 of the virtual area on the upper left corner of a data block 520, the two-bit binary code of 01 is indicated by filling up the defined pattern 522 on the upper right corner, the two-bit binary code of 10 is indicated by filling up the defined pattern 522 on the lower right corner, and the two-bit binary code of 11 is indicated by filling up the defined pattern 522 on the lower left corner. In other embodiments, the coding of each data block can be based on an alternative data block coding indication block 910.

Figure 9A:
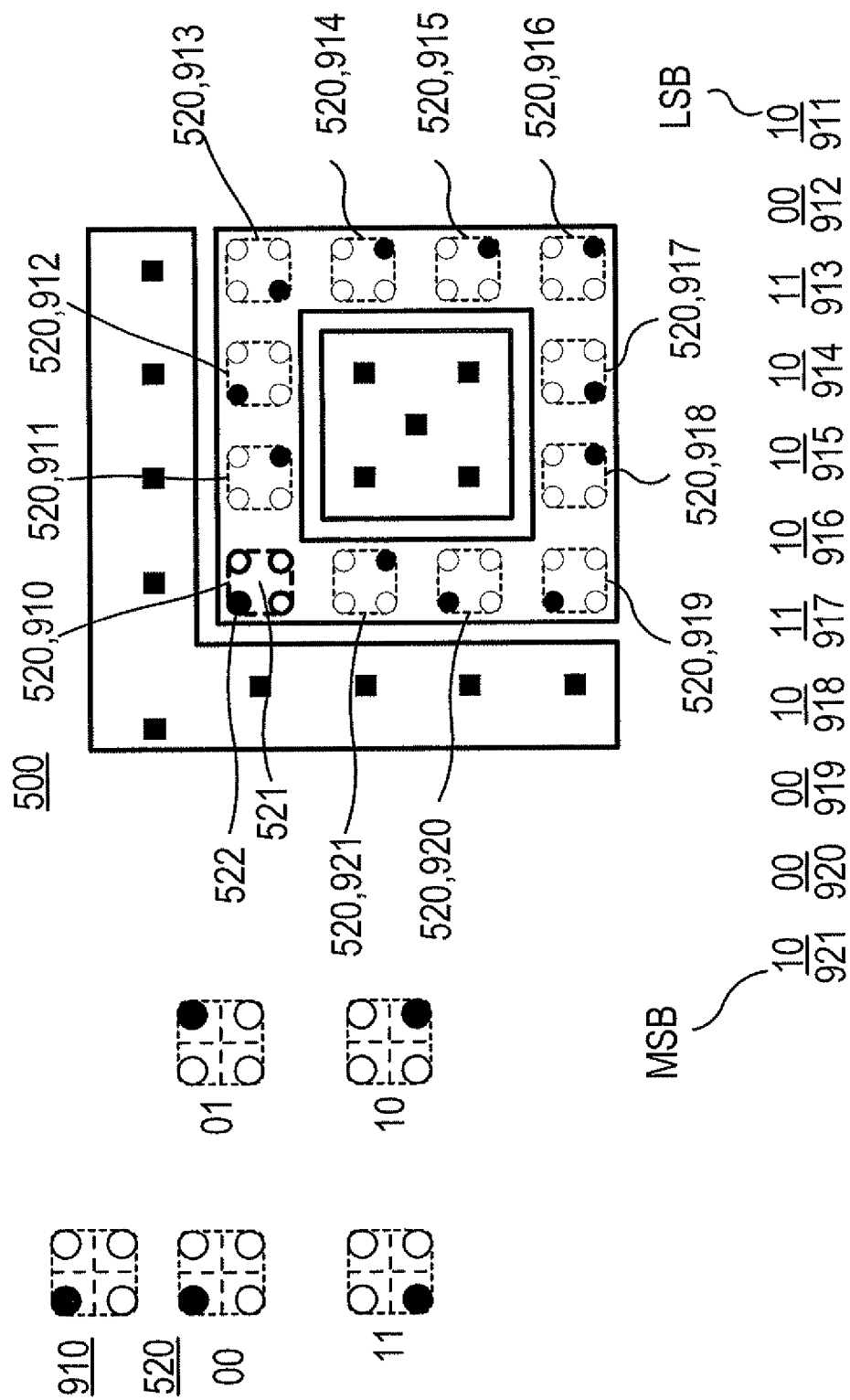
FIGS. 9A-9D schematically illustrate the data block coding indication blocks and corresponding coded data according to another embodiment of the invention.

As shown in FIG. 9A, when the defined pattern 522 of the virtual area on the upper left corner of the data block coding indication block 910 is filled up, the data blocks 911-921 carry the data in a clockwise arrangement, wherein the least significant bit (LSB) of the two-dimensional optical identification code 500 is carried by the data block 911 in coding, and the most significant bit (MSB) is carried by the data block 921 in coding. In this case, the two-dimensional optical identification code 500 in FIG. 9A carries a binary code of 1000010111010101110010.

Figure 9B:
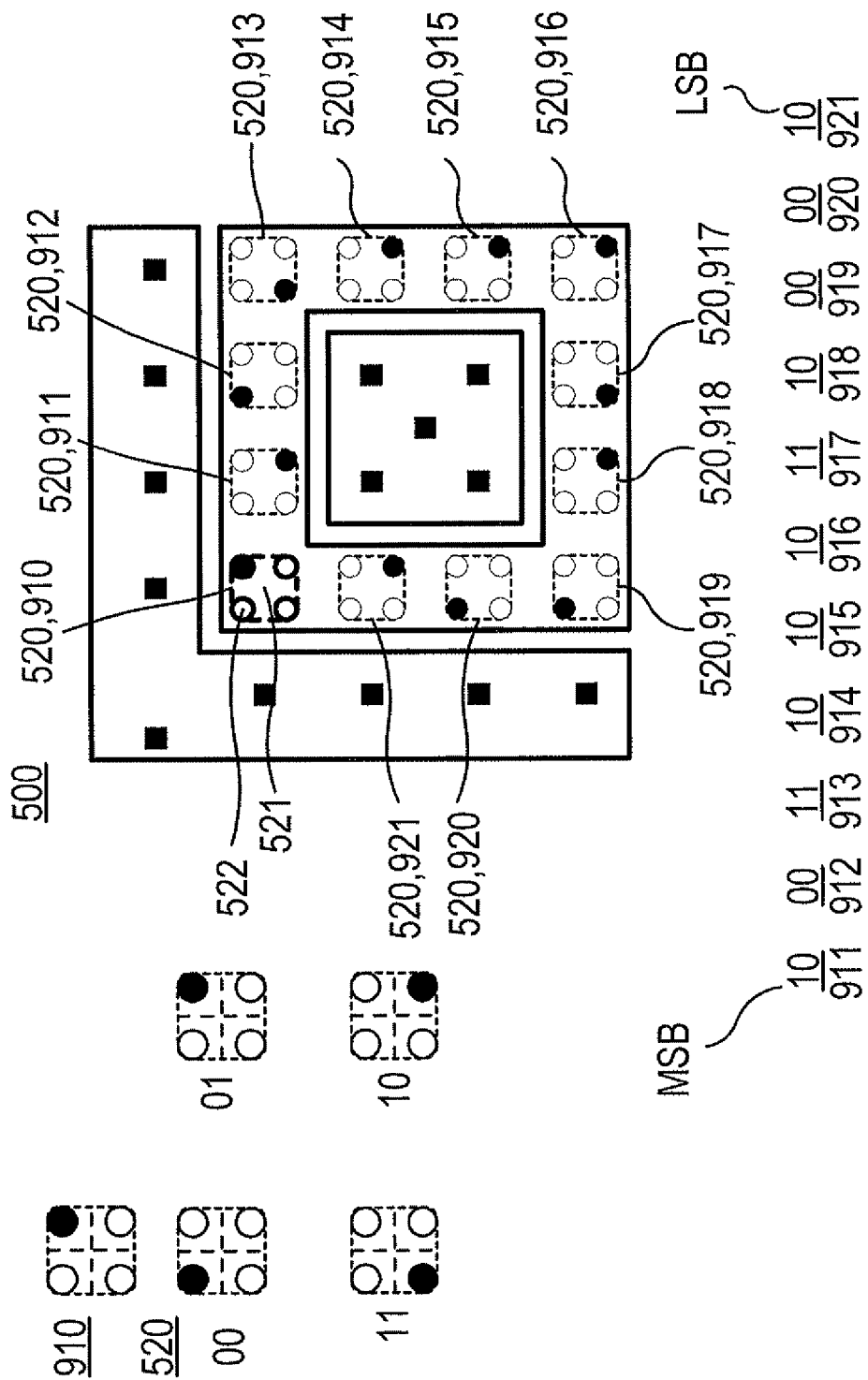

As shown in FIG. 9B, when the defined pattern 522 of the virtual area on the upper right corner of the data block coding indication block 910 is filled up, the data blocks 911-921 carry the data in a counterclockwise arrangement, wherein the least significant bit (LSB) of the two-dimensional optical identification code 500 is carried by the data block 921 in coding, and the most significant bit (MSB) is carried by the data block 911 in coding. In this case, the two-dimensional optical identification code 500 in FIG. 9B carries a binary code of 10001110101011110000010.

Figure 9C:
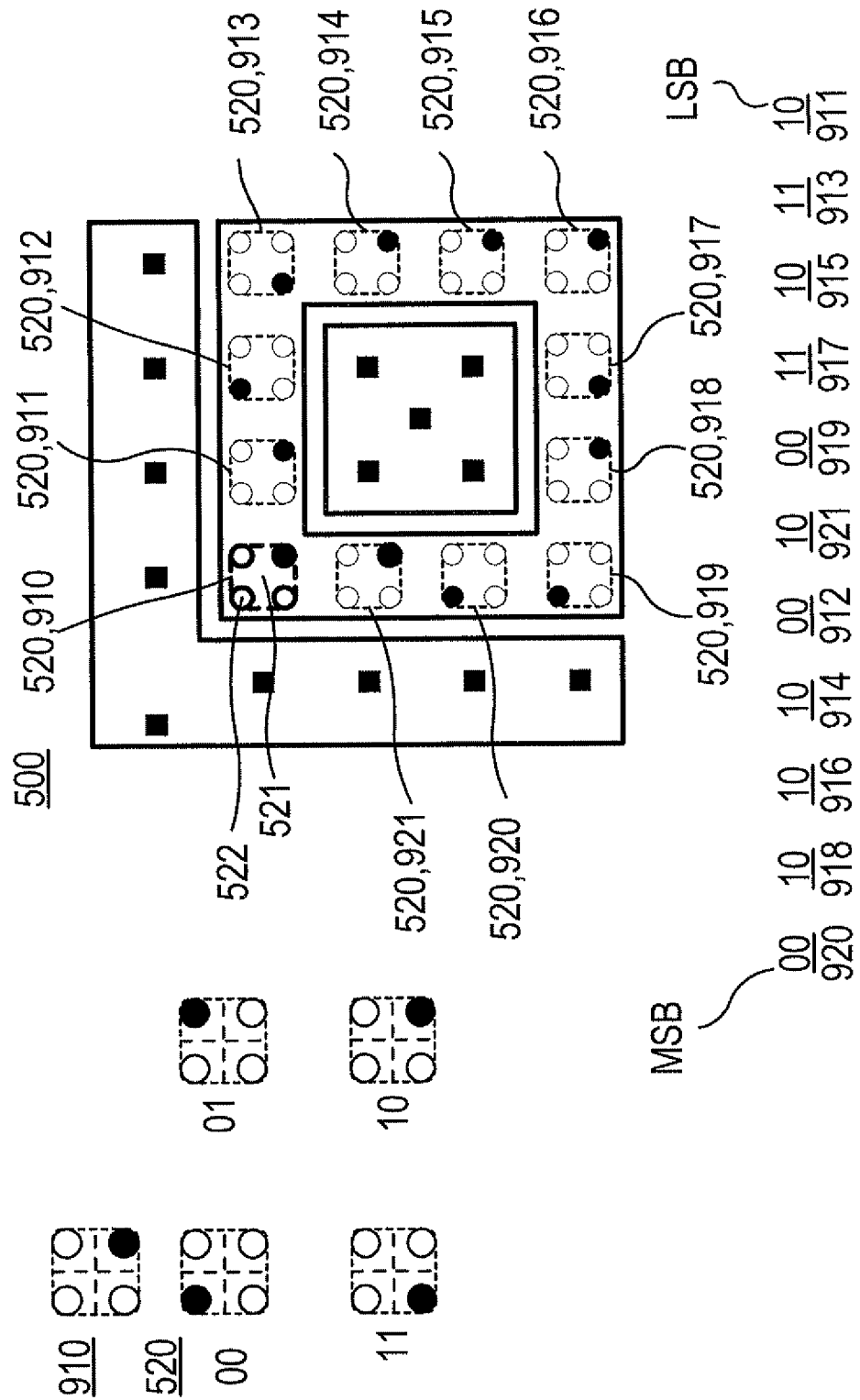

As shown in FIG. 9C, when the defined pattern 522 of the virtual area on the lower right corner of the data block coding indication block 910 is filled up, the data blocks 911-921 carry the data in a clockwise and skipping one data block arrangement, wherein the least significant bit (LSB) of the two-dimensional optical identification code 500 is carried by the data block 911 in coding, and the most significant bit (MSB) is carried by the data block 920 in coding. In this case, the two-dimensional optical identification code 500 in FIG. 9C carries a binary code of 00101010001000111101110".

Figure 9D:
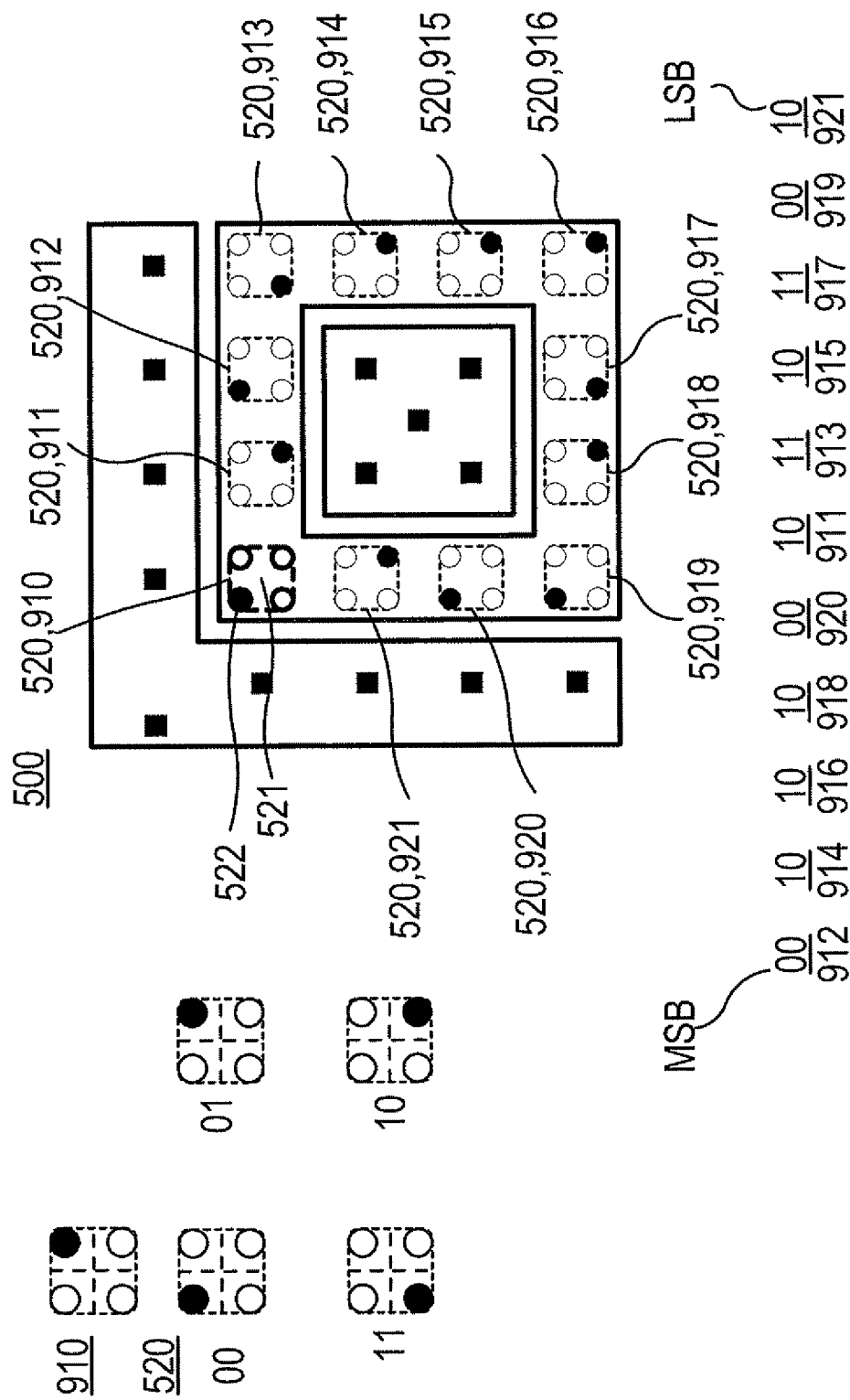

As shown in FIG. 9D, when the defined pattern 522 of the virtual area on the lower left corner of the data block coding indication block 910 is filled up, the data blocks 911-921 carry the data in a counterclockwise and skipping one data block arrangement, wherein the least significant bit (LSB) of the two-dimensional optical identification code 500 is carried by the data block 921 in coding, and the most significant bit (MSB) is carried by the data block 912 in coding. In this case, the two-dimensional optical identification code 500 in FIG. 9D carries a binary code of 00101010001011110110010.

Accordingly, it is obvious that the data blocks 911-921 in FIGS. 9A-9D have the same picture while carrying different data.

Figure 10:
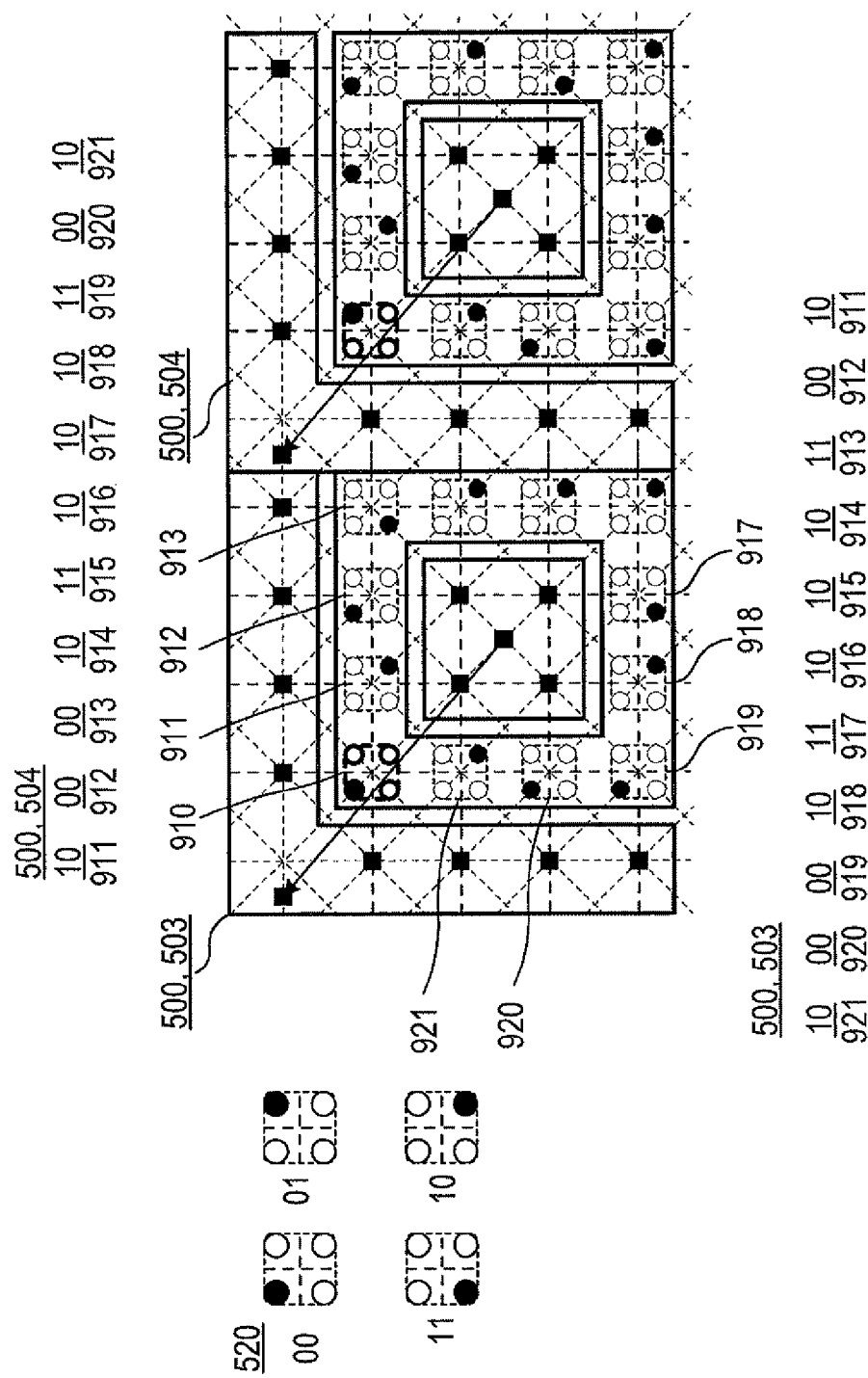
FIG. 10 schematically illustrates data block coding indication blocks and two-dimensional optical identification code with same gray level according to an embodiment of the invention.

FIG. 10 schematically illustrates data block coding indication blocks 910 and two-dimensional optical identification codes 500 with same gray level according to an embodiment of the invention. In FIG. 10, the two-dimensional optical identification code 503 has the data blocks 911-921 with a pattern different from that of the two-dimensional optical identification code 504, but the same data or binary code is carried.

According to the example of FIG. 10, it is applicable to print multiple two-dimensional optical identification codes 500 that carry the same data on the picture object 460 of FIG. 4, and each defined pattern 522 of the data block coding indication block 910 is randomly located in one of the virtual areas 521 produced by equally dividing a data block. Thus, the data blocks 911-921 of adjacent two-dimensional optical identification codes 500 carry the same data but have different or same pattern. The pattern is randomly present, so the two-dimensional optical identification codes on the picture object 460 are randomly produced, which can eliminate the texture feeling on vision. Namely, when the adjacent two-dimensional optical identification codes 503, 504 carry the same binary information, the data block coding indication blocks 910 are used to indicate the coding of the data blocks 911-921 of the two adjacent two-dimensional optical identification codes 503, 504.

Figure 1:
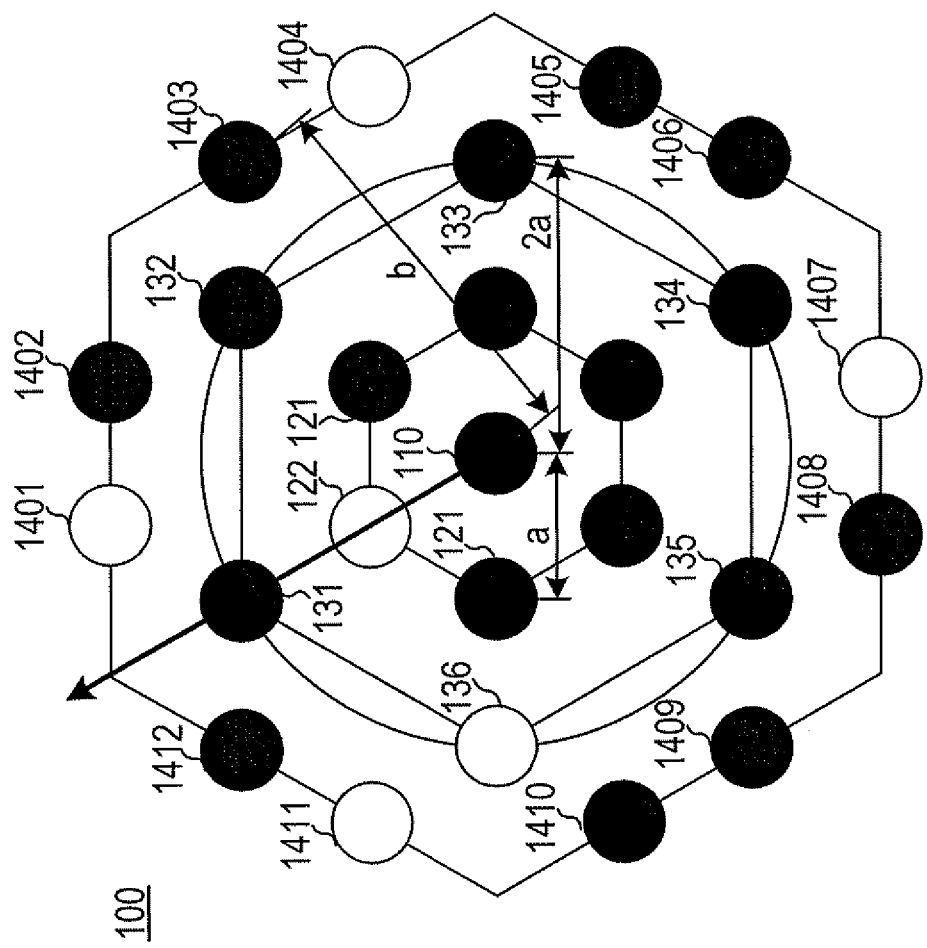
FIG. 1 schematically illustrates a typical optical identification code.
Figure 2:
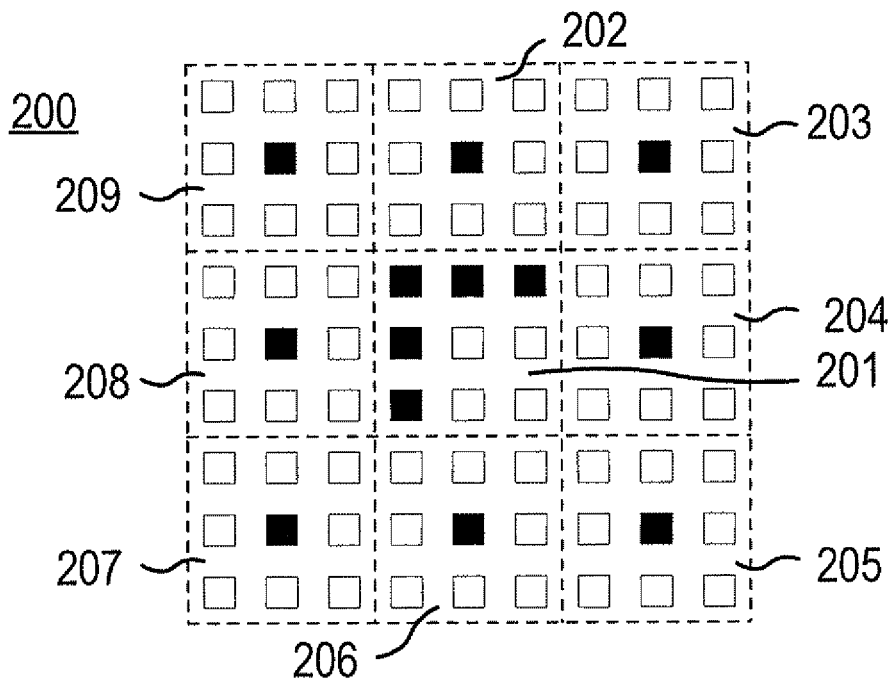
FIG. 2 schematically illustrates another typical optical identification code.
Figure 3:
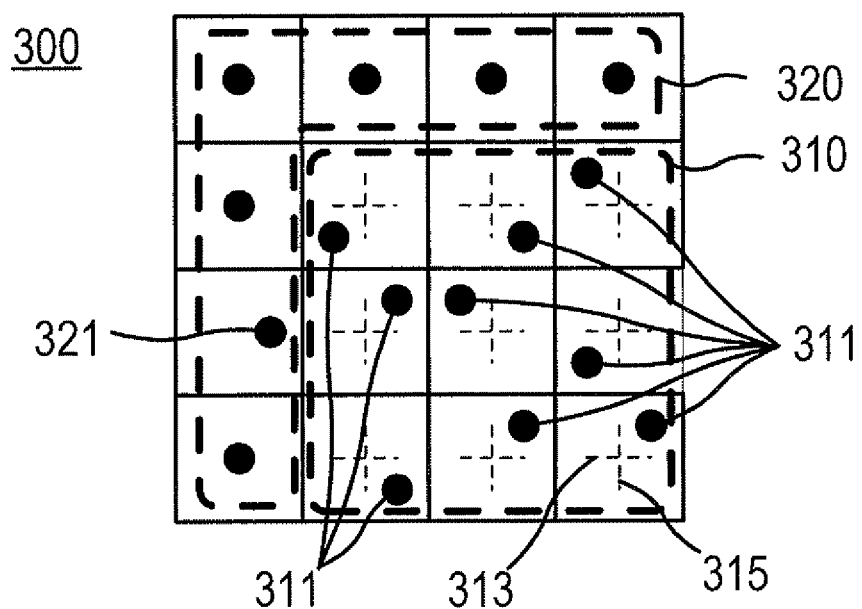
FIG. 3 schematically illustrates a further typical optical identification code.
Figure 11A:
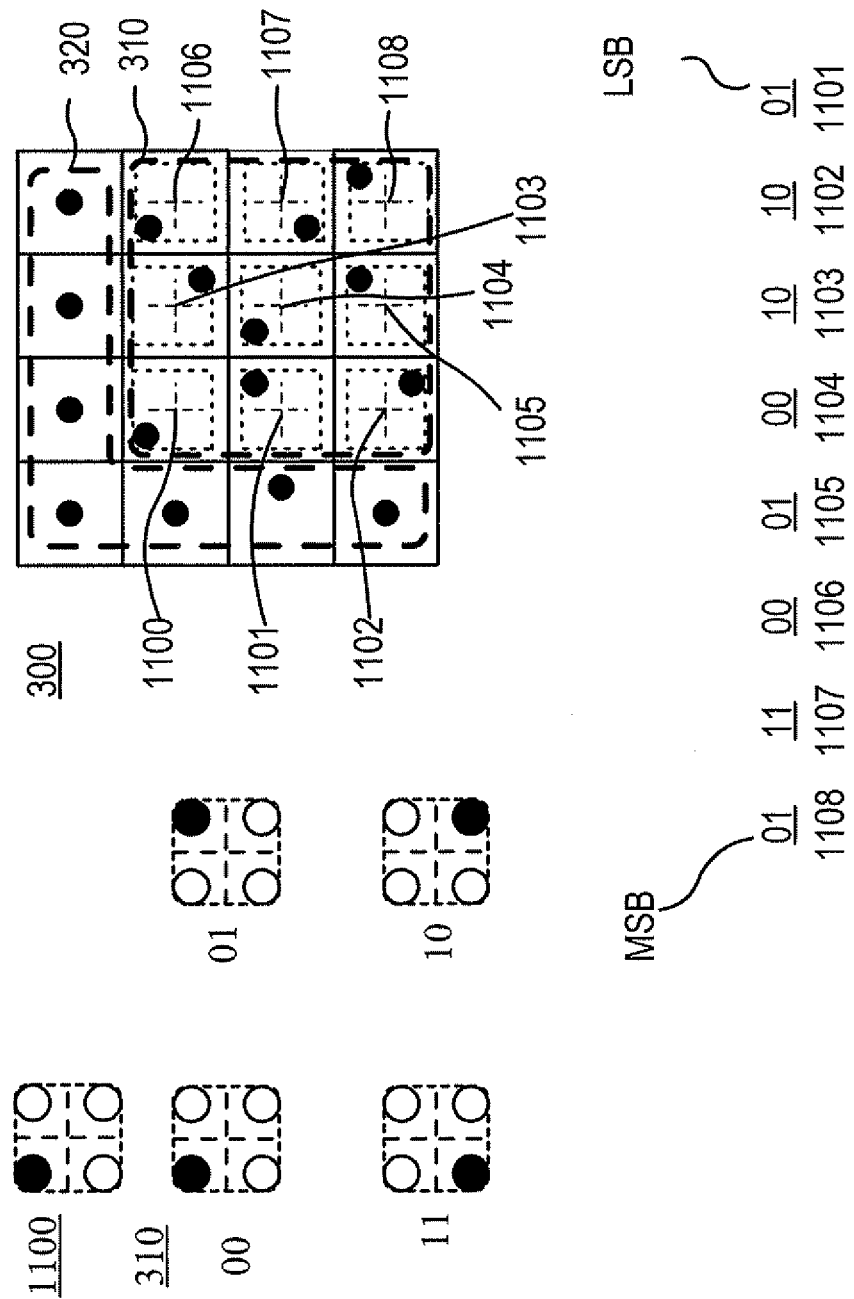
FIGS. 11A and 11B schematically illustrate an application of the present invention to the typical two-dimensional optical identification code.
Figure 11B:
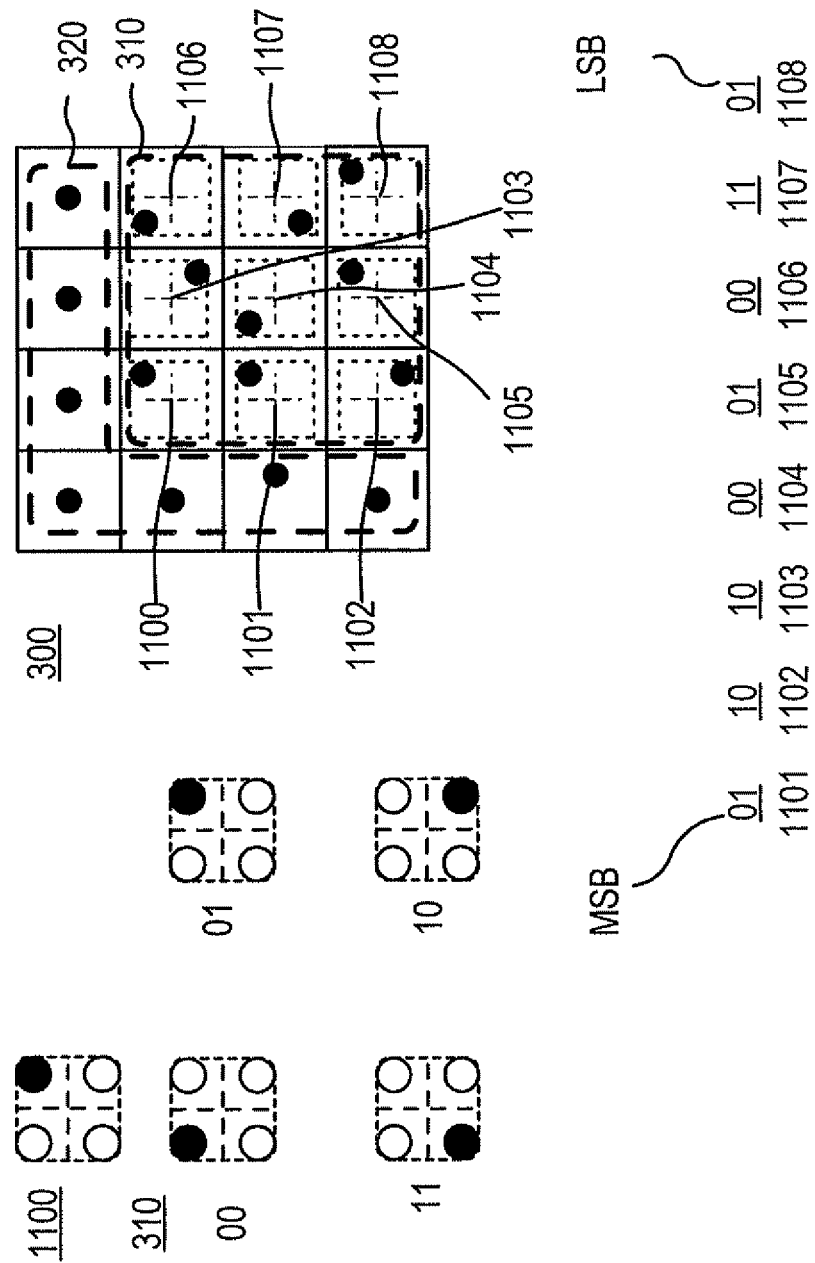

FIGS. 11A and 11B schematically illustrate an application of the present invention to the typical two-dimensional optical identification code of FIG. 3. As shown in FIG. 11A, a coded data block is used as a data block coding indication block 1100. When the defined pattern of the virtual area on the upper left corner of the data block coding indication block 1100 is filled up, the data carried by the data blocks 1101-1108 is arranged from left to right, from upper to lower. In addition, the least significant bit (LSB) of the optical identification code 300 is carried by the data block 1101, and the most significant bit (MSB) of the optical identification code 300 is carried by the data block 1108. In this case, the optical identification code 300 in FIG. 11A carries a binary code of 0111000100101001.

As shown in FIG. 11B, when the defined pattern of the virtual area on the upper right corner of the data block coding indication block 1100 is filled up, the data carried by the data blocks 1101-1108 is arranged from right to left, from lower to upper. In addition, the most significant bit (MSB) of the optical identification code 300 is carried by the data block 1101, and the least significant bit (LSB) of the optical identification code 300 is carried by the data block 1108. In this case, the optical identification code 300 in FIG. 11B carries a binary code of 0110100001001101. The remaining coding is similar, and thus a detailed description is deemed unnecessary.

FIGS. 12A-12D schematically illustrate the data block coding indication blocks 910 and corresponding coded data according to a further embodiment of the invention. The data block coding indication block 910 is used to indicate the coding of the other data blocks 520. In FIGS. 12A-12D, the coding of each data block 520 is based on that in FIGS. 8A-8D respectively.

Figure 12A:
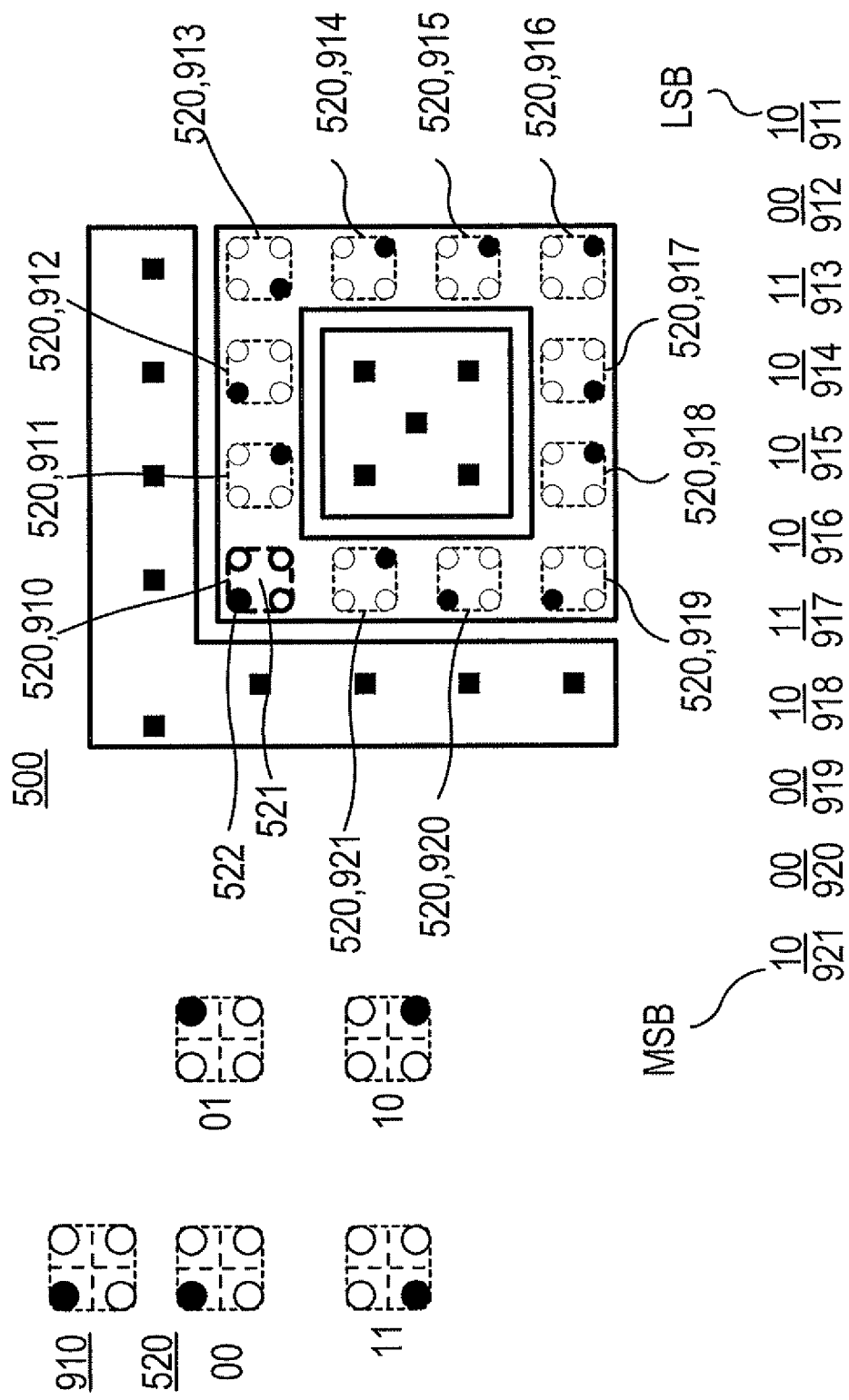
FIGS. 12A-12D schematically illustrate the data block coding indication blocks and corresponding coded data according to another embodiment of the invention.

As shown in FIG. 12A, when the defined pattern 522 of the virtual area 521 on the upper left corner of the data block coding indication block 910 is filled up, the defined patterns 522 of the virtual areas 521 on the upper left, upper right, lower right, and lower left corners are filled up to respectively indicate a two-bit binary code of 00, 01, 10, and 11 for the data blocks 911-921.

Figure 12B:
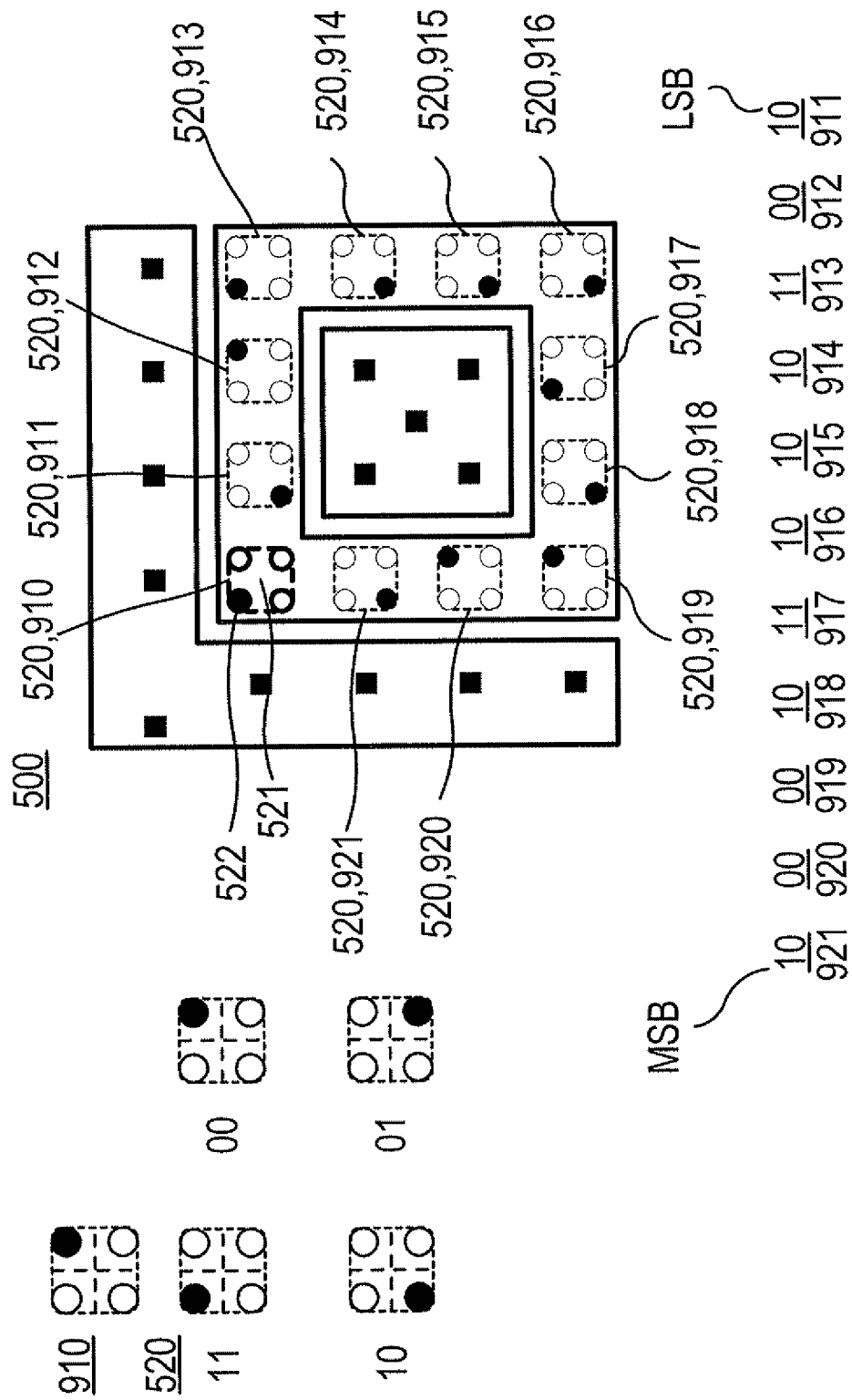

As shown in FIG. 12B, when the defined pattern 522 of the virtual area 521 on the upper right corner of the data block coding indication block 910 is filled up, the defined patterns 522 of the virtual areas 521 on the upper left, upper right, lower right, and lower left corners are filled up to respectively indicate a two-bit binary code of 11, 00, 01, and 10 for the data blocks 911-921.

Figure 12C:
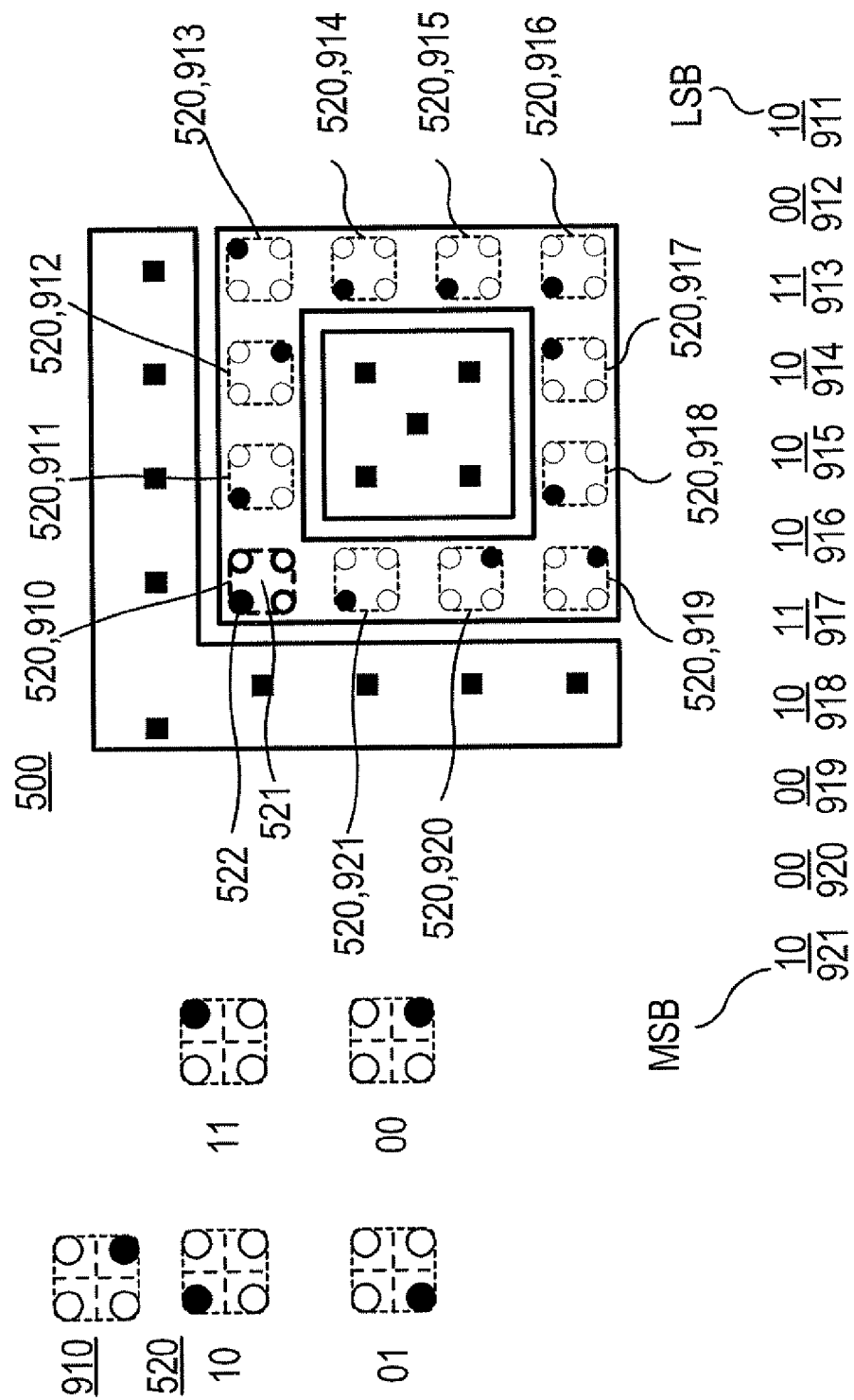

As shown in FIG. 12C, when the defined pattern 522 of the virtual area 521 on the lower right corner of the data block coding indication block 910 is filled up, the defined patterns 522 of the virtual areas 521 on the upper left, upper right, lower right, and lower left corners are filled up to respectively indicate a two-bit binary code of 10, 11, 00, and 01 for the data blocks 911-921.

Figure 12D:
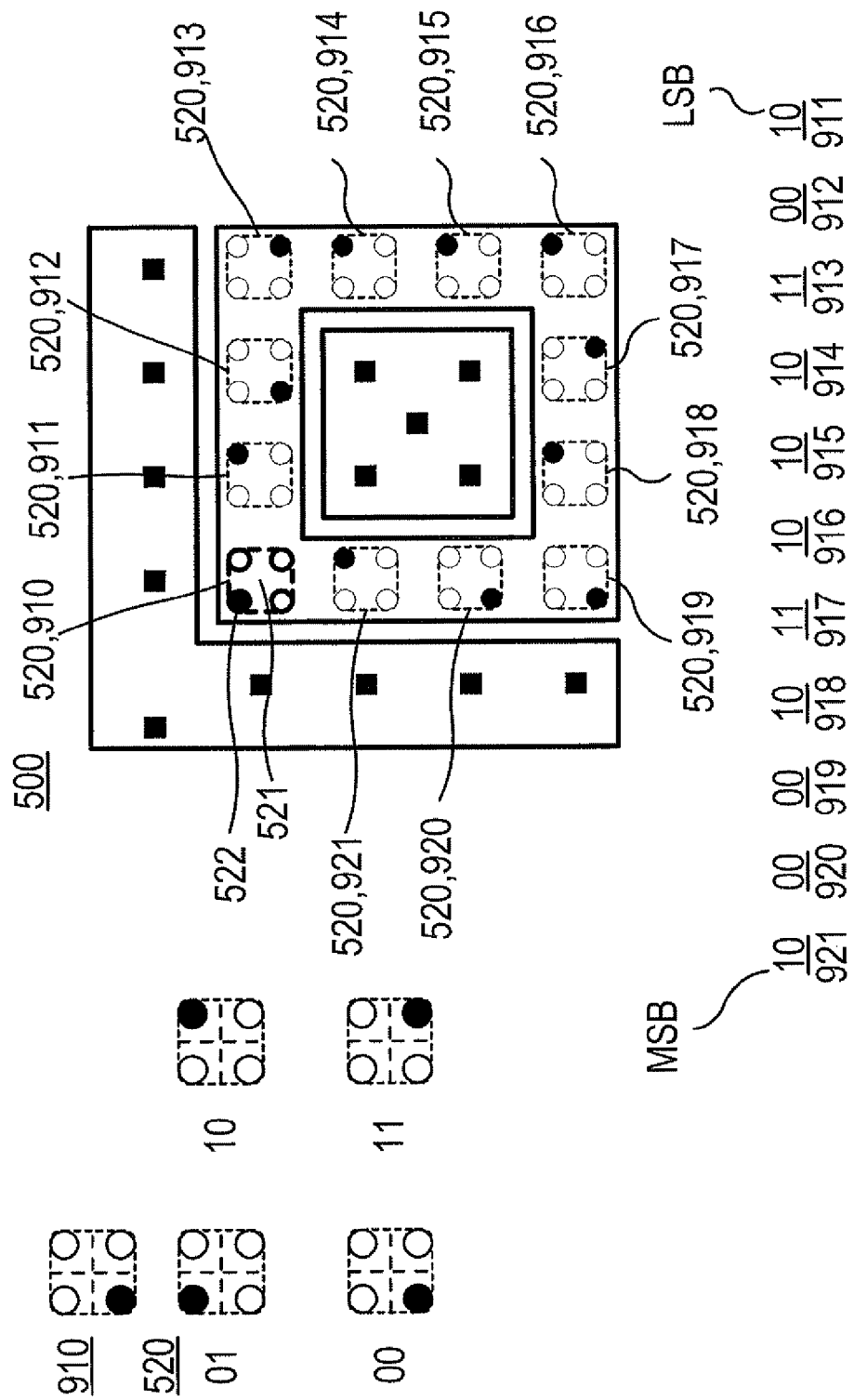

As shown in FIG. 12D, when the defined pattern 522 of the virtual area 521 on the lower left corner of the data block coding indication block 910 is filled up, the defined patterns 522 of the virtual areas 521 on the upper left, upper right, lower right, and lower left corners are filled up to respectively indicate a two-bit binary code of 01, 10, 11, and 00 for the data blocks 911-921.

Accordingly, it is obvious that the data blocks 911-921 in FIGS. 12A-12D carry the same data while the patterns of the corresponding two-dimensional optical identification codes 500 are different.

From the embodiments of FIGS. 9A-9D, 10, 11A-11B, and 12A-12D, it is known that the defined patterns 522 of the data block coding indication block 910 can be randomly present on the virtual areas 521 produced by equally dividing a data block so as to carry the same data by the data blocks 911-921 of the adjacent two-dimensional optical identification codes 500 and, in this case, the data blocks 911-921 of the adjacent two-dimensional optical identification codes 500 have the same or different pictures with patterns randomly produced. Accordingly, the two-dimensional optical identification codes 500 with same gray level are randomly generated so as to avoid producing a texture feeling. Similar to that in FIG. 10, the typical optical identification codes 300 can carry the same data, and the defined patterns of the data block coding indication block 1100 can be randomly present on the virtual areas produced by equally dividing a data block. Therefore, the data blocks 1101-1108 of the adjacent two-dimensional optical identification codes 500 carry the same data embedded in same or different pictures with patterns randomly produced, so as to avoid producing a texture feeling.

As cited, the invention selects a fixed position data block as a data block coding indication block 910 from the data blocks 520 for indicating the coding of the other data blocks. The defined patterns 522 of the data block coding indication block 910 are randomly present on the virtual areas 521 produced by equally dividing a data block. Accordingly, when plural two-bit binary information carried in the adjacent two-dimensional optical identification codes 503, 504 is the same, the data blocks 911-921 of the adjacent two-dimensional optical identification codes 503, 504 are randomly coded since the data block coding indication block 910 randomly carries a coded data. In this case, the data blocks 911-921 of the adjacent two-dimensional optical identification codes 500 have different or same picture with patterns randomly produced, which can avoid presentation of a texture. Namely, it is able to reduce the texture feeling on vision caused by repeatedly producing the same code pattern in the prior art. Also, the two-dimensional optical identification codes have the same gray level.

Although the present invention has been explained in relation to its preferred embodiment, it is to be understood that many other possible modifications and variations can be made without departing from the spirit and scope of the invention as hereinafter claimed.

What is claimed is:

1. A two-dimensional optical identification device, on which a plurality of two-dimensional optical identification codes are arranged, each two-dimensional optical identification code comprising:
   a plurality of data blocks, each data block having a plurality of defined patterns, each defined pattern being located in selected one of a plurality of virtual areas produced by equally dividing the data block; and
   an outer positioning block having a plurality of first positioning points and a first direction identification point and placed at two adjacent boundaries of the data blocks for defining positions of the data blocks;
   wherein at least one fixed position data block is selected as a data block coding indication block from the data blocks for indicating coding of the other data blocks, and each defined pattern of the data block coding indication block is randomly located in one of the virtual areas, the plurality of data blocks of adjacent two-dimensional optical identification codes carry the same data embedded in same or different pictures with patterns randomly produced.

2. The device as claimed in claim 1, wherein each two-dimensional optical identification code records plural two-bit information based on the data blocks each having the defined patterns, each defined pattern being located in selected one of the plurality of virtual areas produced by equally dividing the data block.

3. The device as claimed in claim 2, wherein the data block coding indication block indicates coding of the data blocks of adjacent two-dimensional optical identification codes when the plural two-bit information carried by the adjacent two-dimensional optical identification codes is the same.

4. The device as claimed in claim 3, wherein each two-dimensional optical identification code further comprises:
   an inner positioning block having a plurality of second positioning points for detecting a pattern of the two-dimensional optical identification code;
   wherein one of the first positioning points is defined as a first direction identification point for indicating an identification direction with respect to two-dimensional optical identification code.

5. The device as claimed in claim 4, wherein the plurality of second positioning points include four second positioning points located on four corners of a virtual square and one second positioning point located at a center of the virtual square.

6. The device as claimed in claim 5, wherein the outer positioning block includes N first positioning points arranged in an L shape and the first direction identification point located on a position with an offset from an intersection of two lines of the L shape, where N is a positive integer.

7. The device as claimed in claim 6, wherein, in the N first positioning points, I first positioning points define I first-direction virtual lines, and J first positioning points define J second-direction virtual lines, each data block having a center located at an intersection of a first-direction virtual line and a second-direction virtual line, where I, J are positive integers, and I+J=N.

8. The device as claimed in claim 7, wherein the first-direction virtual lines are vertical to the second-direction virtual lines.

9. The device as claimed in claim 8, wherein each of the data blocks is divided into the plurality of virtual areas by a first-direction virtual line and a second-direction virtual line.

10. The device as claimed in claim 9, wherein the plurality of virtual areas include four virtual areas.

11. The device as claimed in claim 10, wherein each of the data blocks includes four defined patterns, each defined pattern being located in one of the four virtual areas, and only one of the four defined patterns in each of the data blocks is filled up.

12. The device as claimed in claim 11, wherein the defined patterns are filled up for respectively indicating two-bit binary codes of 00, 01, 10, and 11.

13. The device as claimed in claim 12, wherein a defined pattern is a circle or a square.

* * * * *